United States Patent
Ramaswamy et al.

(10) Patent No.: US 12,034,952 B2
(45) Date of Patent: Jul. 9, 2024

(54) SEAMLESS CONTENT ENCODING AND TRANSMISSION

(71) Applicant: Comcast Cable Communications, LLC, Philadelphia, PA (US)

(72) Inventors: Srinath V. Ramaswamy, East Windsor, NJ (US); Weidong Mao, West Windsor, NJ (US); Jason Press, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/145,931

(22) Filed: Dec. 23, 2022

(65) Prior Publication Data

US 2023/0412827 A1     Dec. 21, 2023

Related U.S. Application Data

(63) Continuation of application No. 17/223,748, filed on Apr. 6, 2021, now Pat. No. 11,563,962, which is a
(Continued)

(51) Int. Cl.
*H04N 21/23*     (2011.01)
*H04N 19/172*    (2014.01)
(Continued)

(52) U.S. Cl.
CPC ........... *H04N 19/44* (2014.11); *H04N 19/172* (2014.11); *H04N 21/2401* (2013.01); *H04N 21/44004* (2013.01); *H04N 21/64792* (2013.01)

(58) Field of Classification Search
CPC ..... H04N 21/23; H04N 21/262; H04N 19/658
(Continued)

(56) References Cited

U.S. PATENT DOCUMENTS 9,894,126 B1    2/2018   Block et al.
10,313,412 B1   6/2019   Hall et al.
(Continued)

FOREIGN PATENT DOCUMENTS

WO    2013030852 A2    3/2013

OTHER PUBLICATIONS

Apr. 20, 2020—European Extended Search Report—EP 20150991.6.
Oct. 21, 2021—European Office Action—EP 20150991.6.

*Primary Examiner* — Jeffery A Williams
(74) *Attorney, Agent, or Firm* — Banner & Witcoff, Ltd.

(57) ABSTRACT

Systems, apparatuses, and methods are described for encoding media content based on an ending delay of first media content and a startup delay of second media content. Second media content may be configured for transmission after first media content in a media content stream. The first media content may be associated with an ending delay corresponding to transmission and/or decoding of frames of the first media content. The second media content may be associated with a starting delay corresponding to transmission and/or decoding of frames of the second media content. The first media content and the second media content may be encoded using different encoding formats. Based on comparing the ending delay and starting delay to a threshold, encoding parameters may be selected, one or more frames may be removed from the first media content and/or the second media content, and/or buffers of one or more devices may be adjusted.

20 Claims, 10 Drawing Sheets

Related U.S. Application Data continuation of application No. 16/244,783, filed on Jan. 10, 2019, now Pat. No. 10,999,588.

(51) Int. Cl.
*H04N 19/44* (2014.01)
*H04N 21/24* (2011.01)
*H04N 21/262* (2011.01)
*H04N 21/44* (2011.01)
*H04N 21/647* (2011.01)

(58) Field of Classification Search
USPC .................................................. 375/240.25
See application file for complete search history.

(56) References Cited

U.S. PATENT DOCUMENTS

| | | |
|---|---|---|
| 10,313,722 B1 | 6/2019 | Searl et al. |
| 10,397,291 B1 | 8/2019 | Hall et al. |
| 2002/0118295 A1 | 8/2002 | Karczewicz et al. |
| 2009/0285282 A1 | 11/2009 | Amir et al. |
| 2010/0202509 A1 | 8/2010 | Thompson et al. |
| 2010/0218231 A1 | 8/2010 | Frink et al. |
| 2014/0019633 A1* | 1/2014 | Zhang .................... H04L 65/75 709/231 |
| 2019/0238856 A1 | 8/2019 | Dasari et al. |

* cited by examiner

SEAMLESS CONTENT ENCODING AND TRANSMISSION

CROSS-REFERENCE TO RELATED APPLICATIONS

This application is a continuation of U.S. application Ser. No. 17/223,746, filed on Apr. 6, 2021, which is a continuation of U.S. application Ser. No. 16/244,783, filed on Jan. 10, 2019 and now U.S. Pat. No. 10,999,588, each of which is hereby incorporated by reference in its entirety.

BACKGROUND

Different media content transmitted to a viewer via a media content stream may be in a variety of encoding formats, and a variety of different data rates, such as Constant Bit Rate (CBR), Variable Bit Rate (VBR), and/or Capped Variable Bit Rate (CVBR). For example, video content may be encoded in CBR, but an advertisement displayed after the video content may be in VBR. When transmitted content switches from one encoding to another, such as from CBR to VBR, a viewer may experience a buffering delay, a black screen, and/or visual artifacts.

SUMMARY

The following summary presents a simplified summary of certain features. The summary is not an extensive overview and is not intended to identify key or critical elements.

Systems, apparatuses, and methods are described for encoding media content comprising multiple media content streams encoded using a variety of encoding formats. A media content stream may be transmitted, and the media content stream may comprise first media content followed by second media content. For example, the first media content may be a currently-playing episode of a television show, and the second media content may be an advertisement to be shown after the currently-playing media content. It may take a first period of time for a user device to receive and/or decode one or more last frames of the first media content. It may take a second period of time for a user device to receive and/or decode one or more first frames of the second media content. An encoding parameter may be selected based on the two time periods. The encoding parameter may be selected to avoid delay in presentation of the second media content after the first media content. For example, the encoding parameter may be selected to reduce the time periods and/or to make the two time periods match within a threshold. Additionally and/or alternatively, one or more frames may be removed from the first media content and/or the second media content to reduce a quantity of frames for receipt/decoding. The first media content and/or the second media content may be converted to CBR, VBR, and/or CVBR to reduce and/or control any time required to receive and/or decode frames. The selected encoding parameter may be used to cause encoding of the first media content and/or the second media content. For example, this may allow advertisements to be seamlessly provided in media content streams by modifying encoding parameters for, e.g., transitions between differently-encoded media content in the media content streams.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
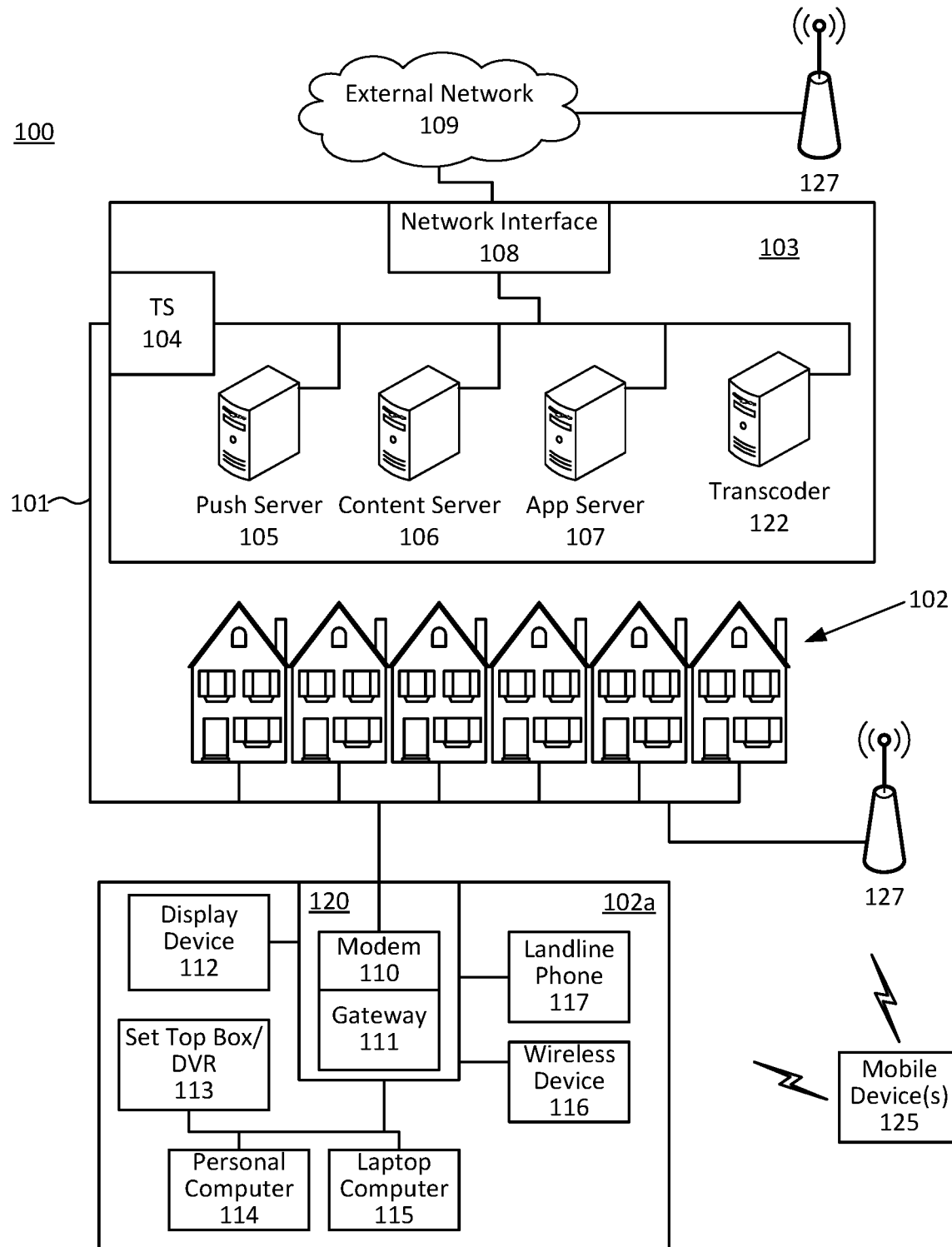
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the transcoder 122 (described below), additional push, content, and/or application servers, and/or other types of servers. Although shown separately, the push server 105, the content server 106, the application server 107, the transcoder 122 (which may also be an encoder), encoder and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
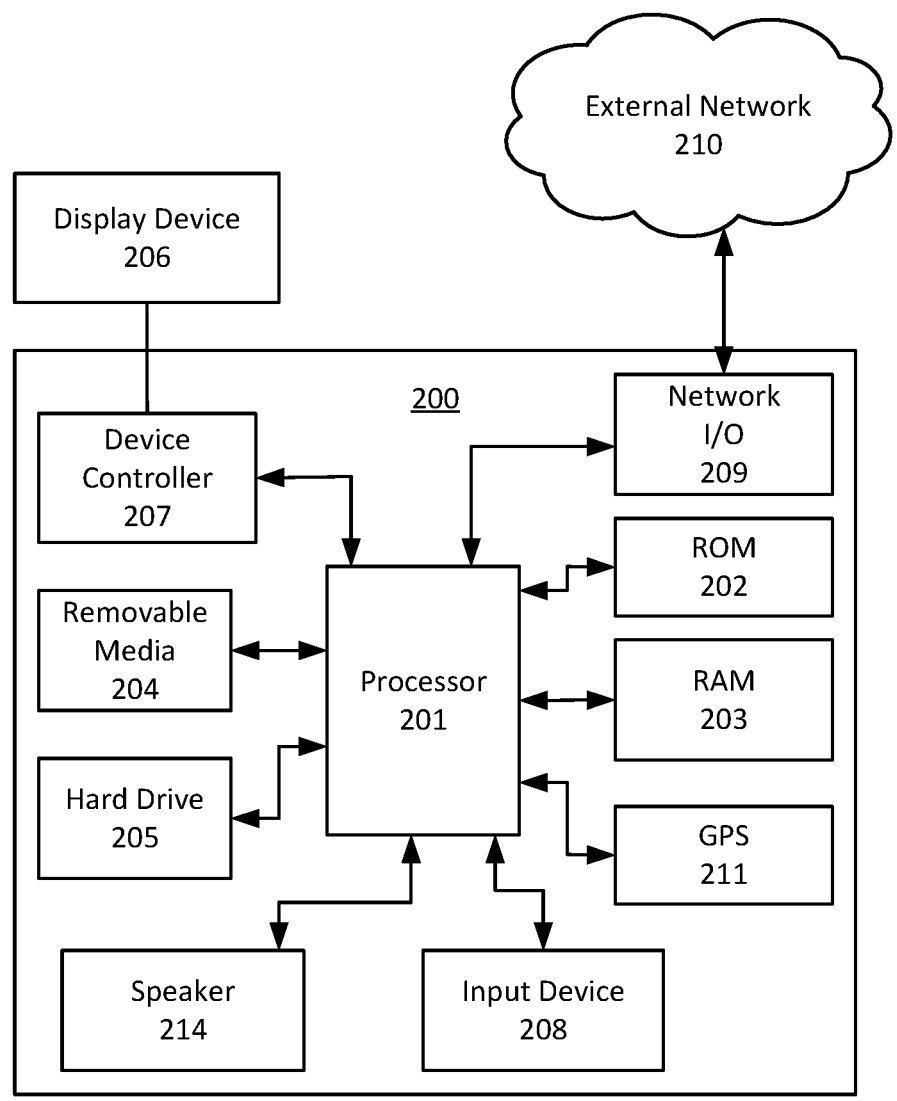
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., the transcoder 122). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 209 (e.g., a network card) to communicate with an external network 210. The network I/O interface 209 may be a wired interface (e.g., electrical, RF (via coax), optical (via fiber)), a wireless interface, or a combination of the two. The network I/O interface 209 may comprise a modem configured to communicate via the external network 210. The external network 210 may comprise the communication links 101 discussed above, the external network 109, an in-home network, a network provider's wireless, coaxial, fiber, or hybrid fiber/coaxial distribution system (e.g., a DOCSIS network), or any other desired network. The communication device 200 may comprise a location-detecting device, such as a global positioning system (GPS) microprocessor 211, which may be configured to receive and process global positioning signals and determine, with possible assistance from an external server and antenna, a geographic position of the communication device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
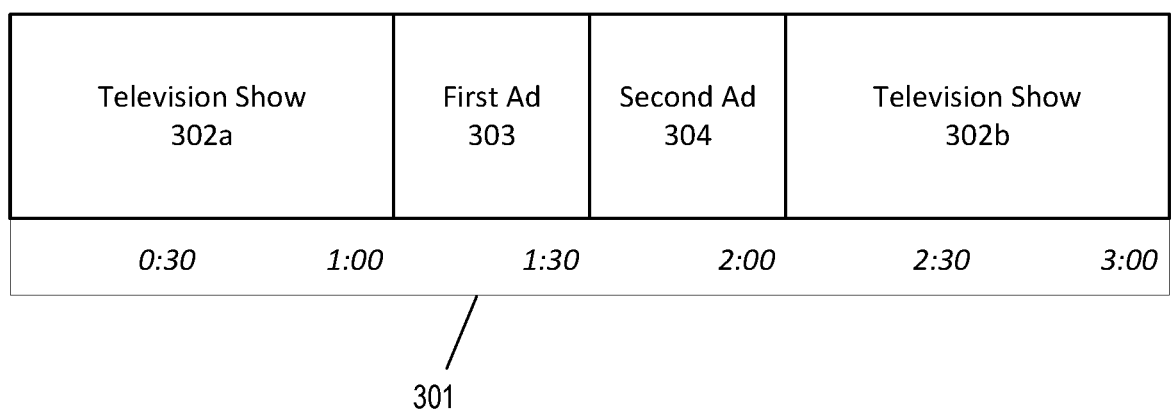
FIG. 3 shows a media content stream timeline.

FIG. 3 is a timeline 301 of content that may be transmitted via a media content stream. The timeline 301 comprises a television show 302a, a first advertisement 303, a second advertisement 304, and a television show 302b. As shown on the timeline 301, the television show 302a stops and the first advertisement 303 begins around 1:00, the first advertisement 303 stops and the second advertisement 304 begins around 1:30, and the second advertisement 304 stops and the television show 302b begins around 2:00. The time periods associated with when first media content (e.g., the television show 302a) switches to second media content (e.g., the first advertisement 303) may be referred to as a transition period and/or a transition point. For example, a transition period may correspond to a few seconds of a television show wherein it fades to black, a few seconds where a display remains black, and then a few seconds corresponding to the beginning of an advertisement. The television show 302a and the television show 302b may be two different portions of the same television show. The media content stream may be transmitted, e.g., from the content server 106, to one or more user devices, which may be configured to decode and display the media content stream. Transmission of the media content stream may comprise transmission of one or more packets, which may correspond to one or more frames of the television show 302a, the first advertisement 303, the second advertisement 304, and/or the television show 302b. Transmission of media content need not correlate to display of the media content. For example, the first advertisement 303 and the second advertisement 304 may be transmitted to the user device much earlier than their display.

Figure 4A:
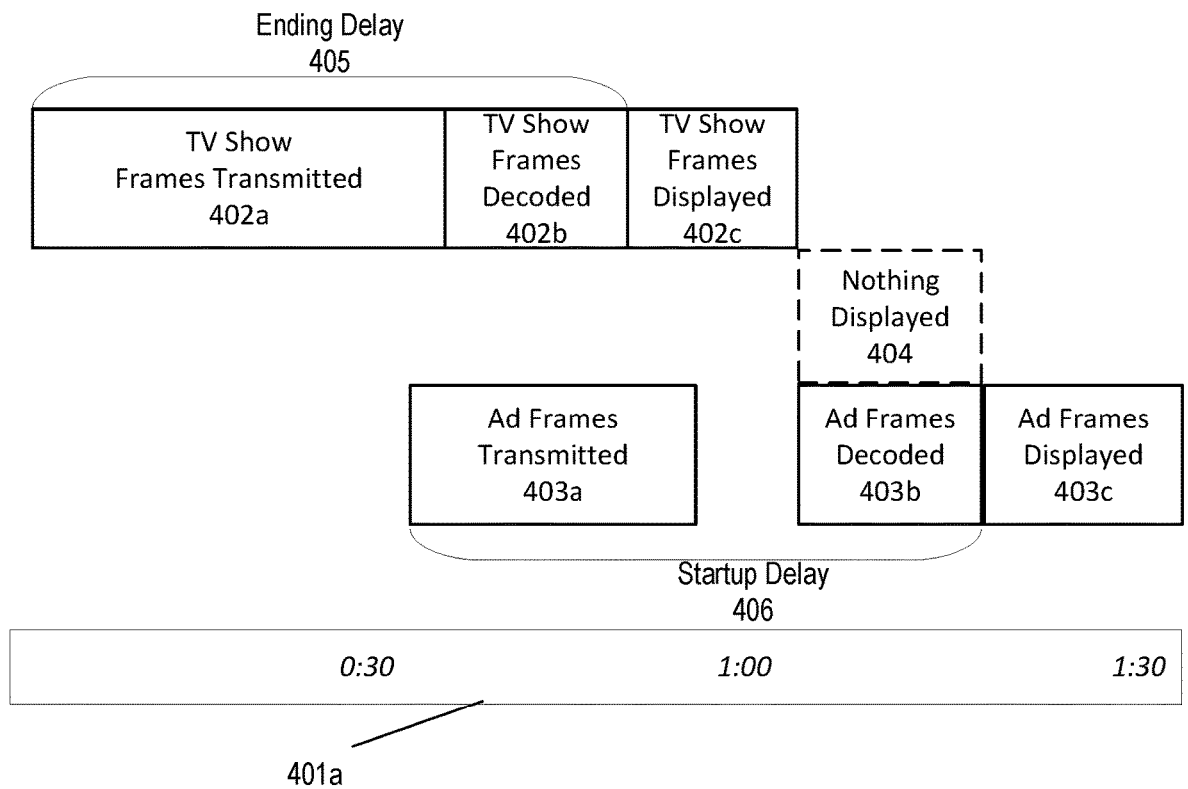
FIG. 4a shows a content transmission timeline with a delay.

FIG. 4a is a timeline 401a showing a delay in transmission and display of media content. The timeline 401a shown may be a subset of the timeline 301 in FIG. 3. The horizontal axis of the timeline 401a corresponds to time. As shown in FIG. 4a, one or more last frames of the TV show are transmitted to a user device (box 402a) from 0:00 to 0:40, are decoded by the user device (box 402b) from 0:40 to 0:50, and are displayed by the user device (box 402c) from 0:50 to 1:05. An ending delay 405 may comprise a transmission time and/or decoding time (e.g., an arrival time of a last packet of a last frame of media content in a decoder buffer). Techniques described herein may be applied to packets in generally the same manner as applied to frames, such as the one or more last frames of the TV show. One or more first frames of the advertisement are transmitted to the user device (box 403a) from 0:40 to 1:05 or in advance and stored in a user device buffer, are decoded by the user device (box 403b) from 1:05 to 1:20, and are displayed by the user device (box 403c) from 1:20 to 1:30. A startup delay 406 may comprise a transmission time and/or decoding time (e.g., an arrival time of ad first frame first packet in the decoder buffer). The startup delay may be a constant predetermined value set, e.g., by an transcoding device (which may alternatively be referred to as an encoding device or encoder) during an encoding process. Though only two sets of frames are depicted in FIG. 4a, other frames (not shown) may be transmitted to, decoded by, and/or displayed by the user device. As a result of the timing of the ending delay 405, the startup delay 406, and the periods when frames are displayed (represented by box 402c and box 403c), a period where nothing is displayed by the user device (represented by box 404) exists from 1:05 to 1:20. This period where nothing is displayed by the user device may comprise the user device displaying a buffering indication, a loading screen, a single frame of the television show, display artifacts, or other similar indications of a delay by the user device. The period may also be associated with audio artifacts or clipping.

The length of the period where nothing is displayed by the user device (represented by box 404) may depend on the encoding of media content transmitted via a media content stream. The length may depend on the on the ending delay 405 and startup delay 406, which may be associated with the bitrate, encoding format, and/or bit distribution of content transmitted, which in turn can affect how long one or more frames take to be transmitted, decoded, and/or presented (e.g., as represented by boxes 402a, 402b, 402c, 403a, 403b, and/or 403c). For example, a television show may be encoded using CBR, such that a certain amount of time of media content (e.g., 1 second) may be associated with a quantity of bits (e.g., 100 kilobits). A user device may, based on the predictability of this bit rate, buffer a quantity of the bits of a show for display such that no interruptions occur during decoding and/or display of the television show. An example of an effect of a video buffer is discussed below with respect to FIG. 4c. In contrast, an advertisement may be encoded using VBR, such that different quantities of bits may correspond to different lengths of the advertisement. For example, a first half of an advertisement may require a low bit rate, causing a user device to buffer, e.g., using a video buffer in RAM, relatively little of the transmission of the advertisement, but a second half of the advertisement may correspond to a large number of bits, causing the user device to pause and download/decode the large number of bits and potentially interrupt display of the advertisement.

The length of the period where nothing is displayed by the user device (represented by box 404) may depend on network conditions (e.g., network delay, network latency, and/or network bandwidth). For example, if the content server 106 is transmitting content to the personal computer 114, then variations in network conditions may delay transmissions (e.g., boxes 402*a*, 403*a*). This may, in turn, lengthen the period where nothing is displayed by the user device.

Figure 4B:
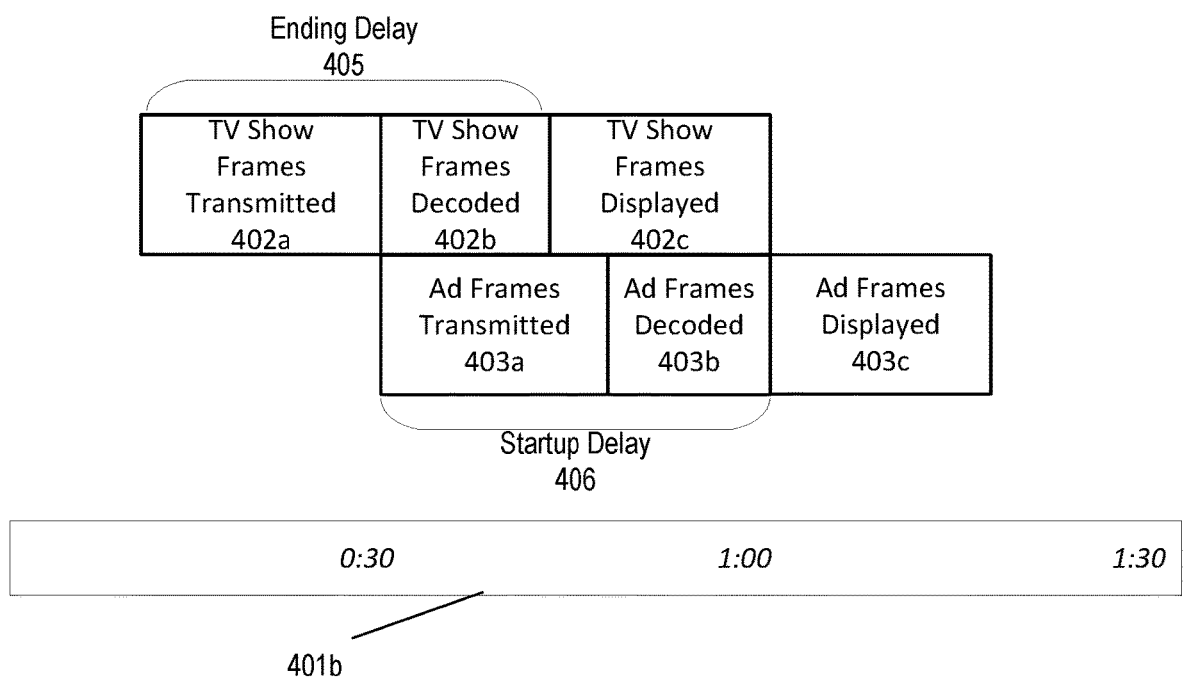
FIG. 4b shows a content transmission timeline without a delay.

FIG. 4*b* shows a timeline 401*b* similar to that of FIG. 4*a*, but without a period where nothing is displayed because the ending delay 405 and the startup delay 406 have been made approximately equal. Interruptions in the display of sequential content may be minimized by making the ending delay 405 and the startup 406 match within a threshold. Though the ending delay 405 and the startup delay 406 shown in FIG. 4*b* are not exactly equal, their difference may be so small (e.g., nanoseconds) that their impact on the display of content via a user device may not be readily noticed by a viewer. Thus, the ending delay 405 and the startup delay 406 need only match within a threshold (e.g., a threshold determined based on the likelihood that the delay would be noticed by the average viewer, result in visual artifacts, or the like).

To shorten the startup delay 406, the size of the advertisement frames transmitted may be lowered by, for example, retrieving a lower quality version of the advertisement frames and/or by re-encoding one or more advertisement frames in a different encoding format. This may, for example, avoid a circumstance where a user device may be unable to download a first portion of an advertisement because previous portions of other media content were large (e.g., such that one or more decoders and/or buffers may be full). One or more frames of the advertisement may be removed and/or compressed, such that the length of the corresponding portion of the advertisement remains the same but transmission may be performed more quickly. Similar steps may be taken with respect to the ending delay 405. For example, one or more frames of the television show may be removed, the ending frames of the television show may be re-encoded and/or compressed, or the like.

Figure 4C:
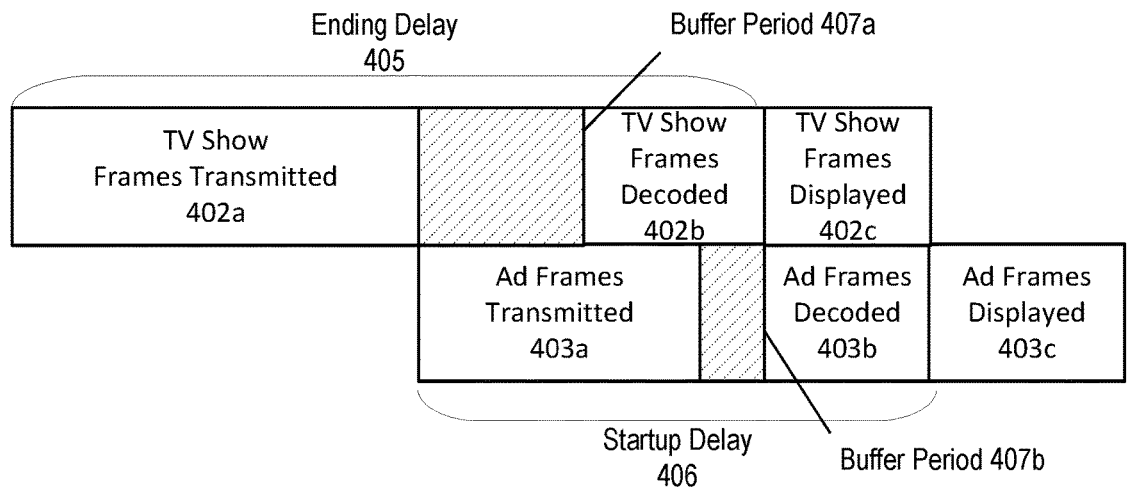
FIG. 4c shows a content transmission timeline with a buffer period.
Figure 4C:
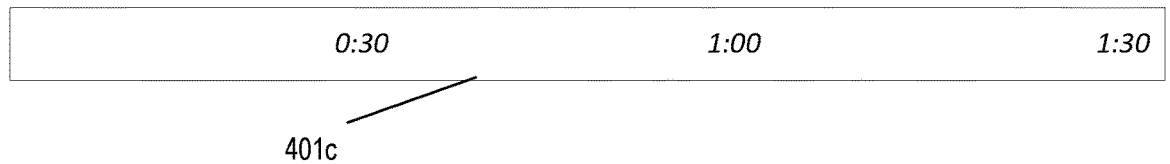

FIG. 4*c* shows a timeline 401*c* using buffer periods. A user device and/or intermediary devices in a network may implement a buffer to cache a duration of media content prior to display to avoid interruptions in the display of content resulting from delays (e.g., the ending delay 405 and the startup delay 406). Buffer periods (e.g., buffer period 407*a* and buffer period 407*b*) may be introduced so that the display of the television show frames (box 402*c*) and the advertisement frames (box 403*c*) are sequential, and no delay occurs. The buffer period 407*a* and the buffer period 407*b* need not be the same. For example, the buffer period 407*a* is longer than the buffer period 407*b* such that display of the television show frames (box 402*c*) and the advertisement frames (box 403*c*) are approximately sequential, even though the particular size and/or length of the frames may be different.

The length of the period where nothing is displayed by the user device (represented by box 404 in FIG. 4*a*, not shown in FIG. 4*c*) may depend on a buffer size (e.g., of a user device and/or transcoding device) and/or an availability (e.g., of the user device and/or transcoding device). A user device and/or transcoding device may, to prevent display interruptions, modify the size and/or availability of a buffer such that frames are received and/or decoded long before they are displayed. If a user device has a small buffer and/or where buffer size of the user device is limited, display interruptions may result. For example, for a CBR video encoded at 1 megabits per second and a user device having a buffer of 10 megabits, the user device may be capable of buffering up to ten seconds of video. Should the user device take longer than ten seconds to decode subsequent frames, an interruption may occur.

Figure 4D:
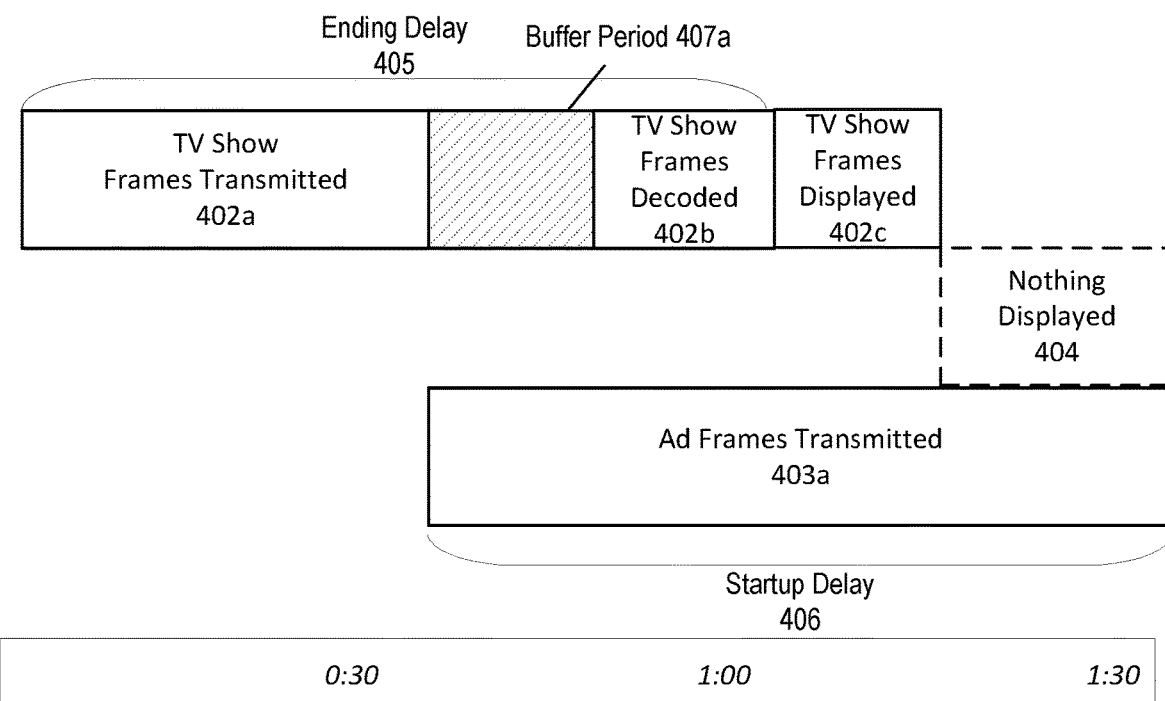
FIG. 4d shows a content transmission timeline with a buffer period and delay.

FIG. 4*d* shows a timeline 401*d* using buffer periods, but involving unexpectedly large advertisement frames. If, for example, the television show was encoded using CBR, the user device may be configured to select a CBR bit rate for the television show (e.g., 100 kbps) such that television show frames may be properly received, buffered, decoded, and displayed without interruption. For example, the user device may be configured to maintain a ten second buffer and have a maximum buffer size of 10 megabits, such that it may retrieve a 1 megabits per second version of the television show. If, however, the advertisement frames are encoded using VBR and/or are only available in higher bit rate CBR (e.g., the first few seconds of the advertisement are 10 megabits per second in CBR or VBR), the user device may be unable to select a bit rate and/or allocate buffer size to avoid interruption. As such, as shown in FIG. 4*d*, it may take so long to receive the advertisement frames that an interruption occurs and nothing is displayed (represented by box 404).

Figure 4E:
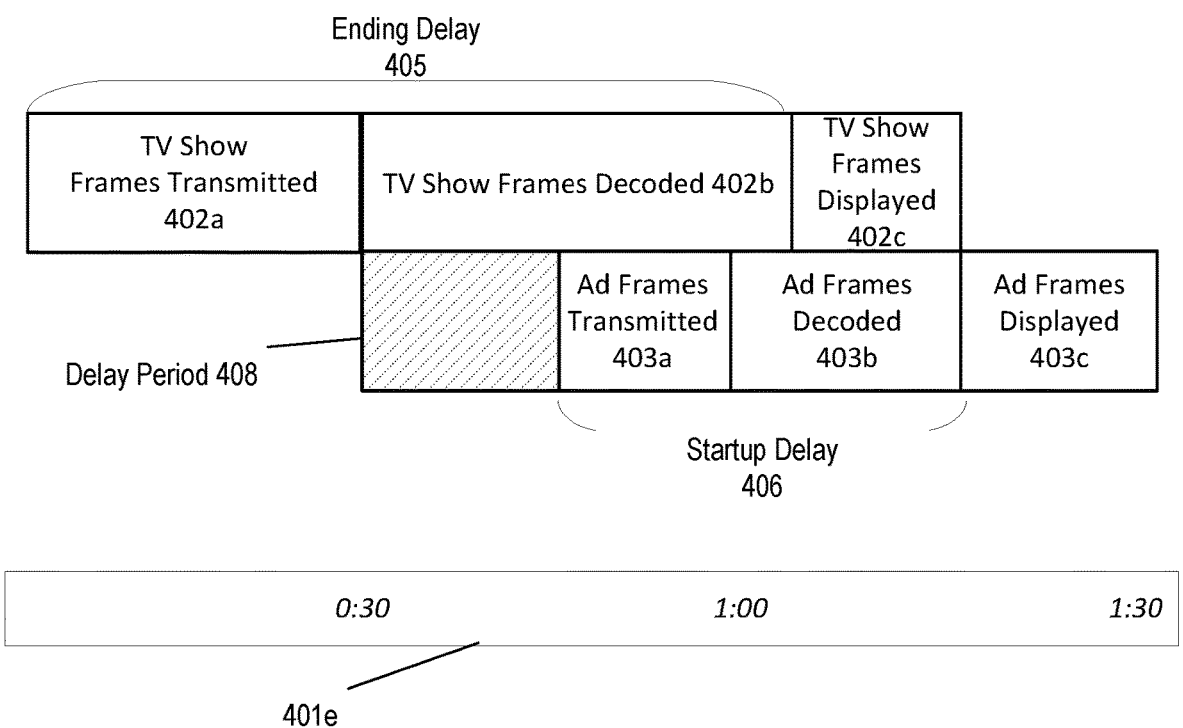
FIG. 4e shows a content transmission timeline with a delay period.

FIG. 4*e* shows a timeline 401*e* where the ending delay 405 exceeds the startup delay 406 and a delay period 408 is added. The delay period 408 is added such that transmission (box 403*a*) and/or decoding (box 403*b*) of the advertisement frames are delayed, and display of the ad frames (box 403*c*) occurs immediately after the television show frames (402*c*). Delays, such as the delay period 408, may be before/after transmission/receipt of one or more frames, may be before/after decoding of one or more frames, and/or may be before/after display of one or more frames. The scenario depicted in FIG. 4*e* may occur where, for example, last frames of a television show require a long time to transmit, decode, and/or display, but the first frames of an advertisement require a relatively shorter time to transmit, decode, and/or display.

Figure 5:
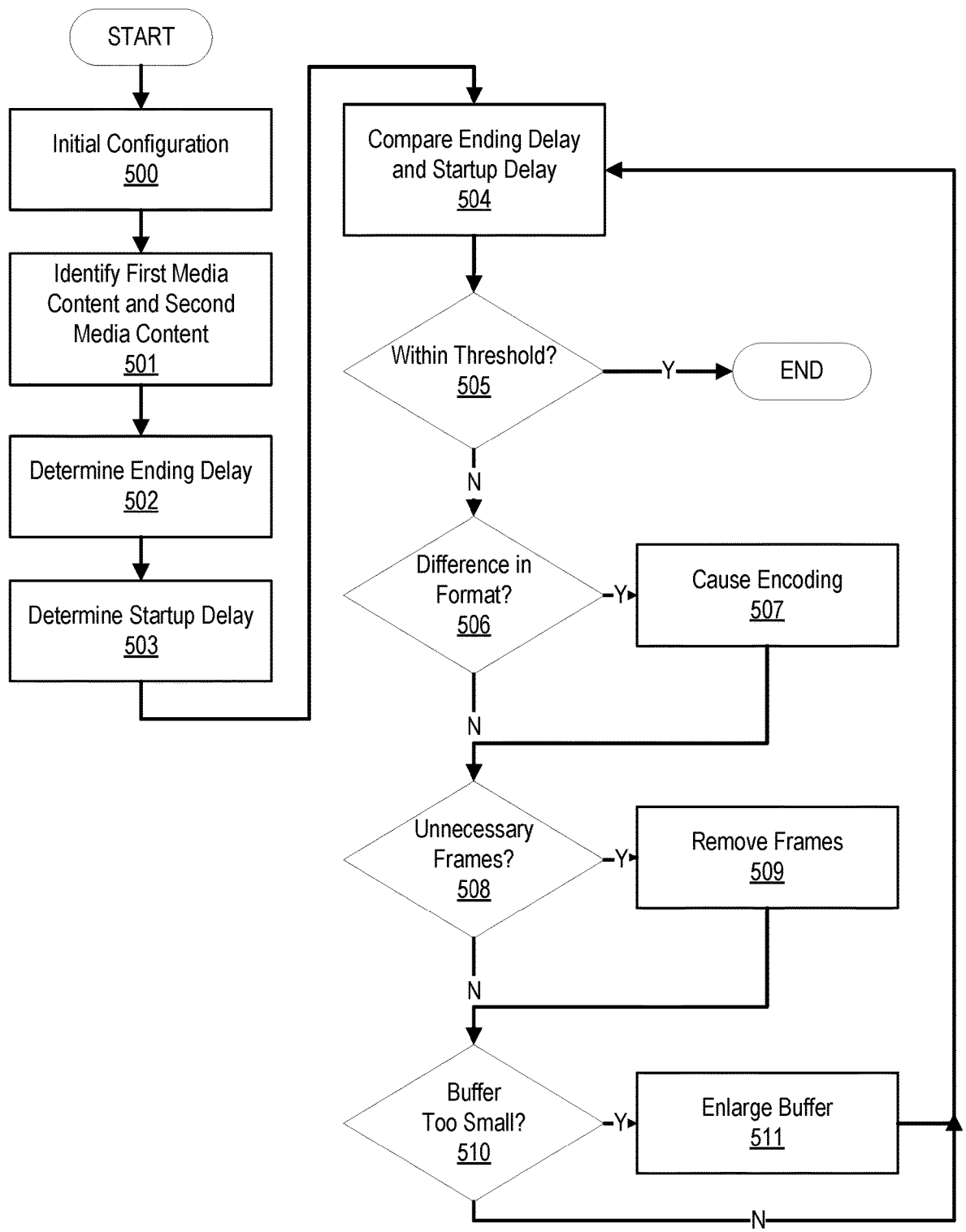
FIG. 5 is a flow chart showing an example method for encoding media content.

FIG. 5 is a flow chart showing an example method for encoding media content. The steps shown in FIG. 5 may be performed by a computing device, such as the computing device 200, the transcoder 122, the app server 107, and/or one or more of the devices described in the household 102*a*. For example, steps shown in FIG. 5 may be performed by a transcoder (e.g., the transcoder 122), and/or may be performed by a user device (e.g., the laptop computer 115).

In step 500, initial configuration settings may be determined. Information about user devices, such as their buffer size and availability, may be determined and stored. Network condition information, such as bandwidth, latency, and reliability, may be determined and stored. Available encoders may be determined and selected based on their abilities. For example, a plurality of encoders may be queried to determine their availability, including their ability to encode content in VBR, CBR, and CVBR. One or more encoders capable of removing frames from media content may be identified. Maximum acceptable delay times may be determined. For example, it may be determined that the maximum acceptable delay time between two pieces of media content may not exceed a second because any larger delay may be easily noticed by the average viewer.

In step 501, first media content and second media content may be identified. The first media content and second media content may be transmitted in a media content stream. Media content, such as the first media content and second media content, may be any audiovisual content, such as a television show, movie, advertisement, and/or a live broadcast. Media content may be encoded (e.g., in CBR, VBR, or CVBR)

using one or more encoding standards, such as MPEG-4 Part 10, Advanced Video Coding (MPEG-4 AVC). The first media content and/or second media content may be identified based on metadata, e.g., a manifest that provides timecodes for the end of the first media content and/or the beginning of the second media content and/or information about the encoding of the first media content and/or the second media content. Additionally and/or alternatively, the first media content and the second media content may be identified by determining a portion of the media content stream that switches from a first type of encoding (e.g., CBR) to a second type of encoding (e.g., VBR). For example, a computing device may be configured to buffer a certain amount of a media content stream before it is transmitted to user devices, such that the differences in types of encoding may be detected by analyzing the media content stream as stored in the buffer. Additionally and/or alternatively, the first media content and/or second media content may be determined based on cue tones in streams. For example, as described in Society of Cable Telecommunications Engineers (SCTE) standard 35, one or more cue tones may be inserted into a telecommunications stream to indicate a time period wherein an advertisement may be inserted. The presence of these tones may be used to distinguish between the first media content (wherein no cue tone may be present) and second media content (wherein the tone may be present an advertisement may be displayed). As another example, first media content may be determined based on a cue tone indicating an end of content being distributed, whereas second media content may be determined based on a cue tone indicating a beginning of content.

The first media content and second media content may come from different sources and have different encoding properties, such as different encoding formats. For example, the first media content and second media content may be at a different resolution, bit rate, have different dynamic ranges, and/or may require different levels of decoding prior to display. For example, the content server 106 may store television shows at 720p and in CBR, whereas advertisements may be stored on the app server 107 at 1080p and in VBR.

In step 502, an ending delay is determined. The ending delay may comprise one or more time periods associated with transmission of, receipt of, and/or decoding of one or more ending frames of the first media content. For example, it may take 50 ms for the content server 106 to transmit, and user equipment (e.g., a set-top box or other forms of the gateway 111) to receive, process, and/or cause display of, one or more last frames of the first media content, it may take 10 ms for the display device 112 to decode the last frames, and the last frames may be for 100 ms of the first media content. The ending delay in that example may be 60 ms, with a corresponding display time of 100 ms. The ending delay may be projected and/or estimated. For example, the amount of time it may take to transmit, decode, and/or display frames may be predicted based on network conditions, processing capabilities of the user device, or similar considerations to generate a projected ending delay.

In step 503, a startup delay is determined. The startup delay may comprise one or more time periods associated with transmission of, receipt of, and/or decoding of one or more frames of the second media content. For example, it may take 10 ms for the content server 106 to transmit, and the display device 112 to receive, first frames of the second media content, it may take 5 ms for the display device 112 to decode the first frames, and the first frames may be for 50 ms of the first media content. The startup delay in that example may be 15 ms, with a corresponding display time of 100 ms. Like the ending delay, the startup delay may be projected and/or estimated based on network conditions, processing capabilities of the user device, or similar considerations.

In step 504, the startup delay and the ending delay are compared, and differences between the delays may be determined. The transmission times of the last frames of the first media content may be compared with the transmission times of the first frames of the second media content. The decoding times of the last frames of the first media content may be compared with the decoding times of the first frames of the second media content. For example, the last frames of the first media content may take a comparatively longer amount of time to decode than the first frames of the second media content because the former may have a higher resolution than the latter. The display times of the last frames of the first media content may be compared with the display times of the first frames of the second media content. For example, the last frames may correspond to the last thirty seconds of the television show, but the first frames may correspond to only five seconds of the advertisement.

In step 505, the differences between the delays may be compared to a threshold. The threshold may be a maximum acceptable delay time and may be based on an amount of difference between the delays that may be acceptable. The difference between the delays may be acceptable if the last frame of the first media content and the first frame of the second media content are displayed without interruption and/or with a sufficiently short interruption (e.g., such that the interruption is barely detectable by the average viewer). The difference between the delays may be acceptable if the last frame of the first media content and the first frame of the second media content are displayed without artifacts and/or with an acceptably low number of artifacts. The threshold may be based on the genre and/or length of the first media content and the second media content. For example, a relatively large delay may be acceptable after the end of a movie or television show, but may be unacceptable between relatively short advertisements. If the difference satisfies the threshold, for example where the difference between the delays is lower than the acceptable delay, the flow chart may end. Otherwise, the flow chart may proceed to step 505.

In step 506, the first media content and the second media content may be compared to determine whether there is a difference in a format of the first media content and a format of the second media content. For example, the first media content may be encoded in CBR, but the second media content may be encoded in VBR, or vice versa. The first media content and the second media content may also differ in that they may be encoded at different maximum bit rates, resolutions, with different quantization parameter (QP), or the like. These differences may cause delay because, for example, a user device may be unable to properly predict and transmit VBR or CBR content where it has an unexpectedly high bit rate. Such a delay may be avoided if, for example, all or portions of the first media content and the second media content are transmitted using CBR or CVBR and at a particular bit rate such that the user device may allocate bandwidth to and properly buffer the content. It thus may be desirable to convert VBR portions of the first media content and/or the second media content to CBR or CVBR. As another example, a switch from low resolution to high resolution content may cause undesirable lag in a user device, and thus user experience may be improved if the high resolution content is re-encoded into a lower resolution.

If there is a difference in format, the flow chart proceeds to step 507. Otherwise, the flow chart proceeds to step 508.

In step 507, all or portions of the first media content and/or the second media content may be encoded. The all or portions of the first media content and/or the second media content may be encoded such that a projected difference in startup delay and ending delay is less than a maximum acceptable delay time. As the first media content and/or the second media content may already be encoded, this step may comprise re-encoding the first media content and/or the second media content. An encoder, such as the transcoder 122, may be instructed to encode the first media content and/or the second media content using one or more encoding parameters selected based on the comparison in step 504. Such encoding parameters may comprise, for example, an indication to encode all or portions of the first media content and/or the second media content in CBR or CVBR and at a particular bit rate. The particular bit rate may additionally and/or alternatively be selected based on the capabilities of the user device and availability of the network. For example, if network conditions are poor and/or if a user device has a relatively small buffer, the bit rate selected may be relatively low.

Where the first media content and/or the second media content are encoded in VBR, it may be desirable to encode the VBR content into CBR or CVBR. By re-encoding the first media content and/or the second media content in a manner that limits the maximum number of bits per second to a predetermined bit rate, buffers may be accordingly adjusted based on the predetermined bit rate such that no interruption occurs. For example, VBR media content having an initial bit rate of 10-50 megabits per second may be re-encoded in CVBR or CBR of 5 megabits per second. Additionally and/or alternatively, a predetermined quantization parameter (QP) may be used to affect the size of the first media content and/or the second media content. For example, the first media content may be encoded using a relatively small QP so that more detail is retained, but the first media content may be re-encoded using a relatively larger QP such that less detail is retained and the overall file size of the first media content is lowered. The predetermined bit rate and/or predetermined QP may be based on network conditions, capabilities of one or more user devices (e.g., the projected speed in which a user device may decode media content at a particular bit rate and/or QP), or the like.

In step 508, the first media content and/or the second media content may be analyzed to determine whether unnecessary frames are present in the first media content and/or the second media content. The first media content and/or the second media content may comprise one or more entirely black frames (e.g., frames after the content has faded out) and/or frames that are repeated (e.g., the same image repeated multiple times). A computing device may detect such frames by comparing two or more adjacent frames in the first media content and/or the second media content such that, if the two frames are identical (e.g., as determined by hashing both frames and comparing the hashes) and/or sufficiently similar (e.g., as determined by comparing the two or more frames and determining that the color and brightness of the pixels are 99.9% similar across the frames), a match is determined to exist. Such frames may be removed (and, if desired, replaced by repeating an existing frame) without being easily noticed by a viewer. This removal may reduce the overall size of the first media content and/or the second media content, decreasing transmission and/or decoding time. If there are unnecessary frames, the flow chart proceeds to step 509. Otherwise, the flow chart proceeds to step 510.

The one or more unnecessary frames may be based on determining that the unnecessary frames have little or no visual content. Solid-colored frames that do not contain any content may have no or minimal visual content, whereas frames of an exciting chase scene in a movie may have significant amounts of visual content. Such visual content may be determined based on metadata (e.g., metadata indicating that a particular number of frames are all black) and/or an analysis of one or more frames (e.g., noticing that a frame comprises nothing but a single color). Visual content may be determined based on a scene detection algorithm. A manifest file associated with the first media content and/or the second media content may indicate one or more portions of first media content and/or second media content that have little to no visual content.

In step 509, one or more unnecessary frames may be removed from the first media content and/or the second media content. Removing the one or more unnecessary frames may comprise re-encoding the first media content and/or the second media content, as described with respect to step 507. For example, the transcoder 122 may be instructed to re-encode the first media content and/or the second media content while simultaneously removing certain frames from the first media content and/or the second media content. Removing the unnecessary frames may additionally and/or alternatively comprise using the trim functionality available in video editing tools. Removing the unnecessary frames may additionally and/or alternatively comprise causing one or more frames to repeat. For example, all but one entirely black frame may be removed from media content, and the remaining black frame may be repeated for a duration corresponding to the removed frames. Additionally and/or alternatively, the removed frames may be replaced with different frames, e.g., blank frames encoded at a lower bitrate.

In step 510, the system may determine whether a buffer (e.g., in a user device) is too small to store a necessary amount of the first media content and/or the second media content. A buffer may be configured in user devices (e.g., within the RAM of the personal computer 114) and/or may be located in one or more devices on a network (e.g., between the content server 106 and the display device 112). The buffer may be associated with a buffering algorithm, e.g., executing on the user device. The buffer may be configured to store a certain quantity (e.g., a number of frames, a number of bits, a period of time) of a media content stream. But given the ending delay and/or the startup delay and/or current network conditions, the buffer may be too small: for example, the second media content may be in VBR and have a high bit rate early on, such that a relatively small buffer may overflow. As another example, network conditions may be so poor that a high bit rate VBR content may take an undesirably long time to be downloaded by a user device, such that early retrieval and buffering of the high bit rate VBR content may be necessary to avoid visual interruption. As such, increasing the size of a buffer may be desirable where doing so would reduce the possibility of an interruption in the display of content. Decreasing the size of a buffer may also be desirable where the first media content and/or the second media content are live, such that an excessively large buffer may excessively delay the display of the first media content and/or the second media content. If the buffer is too small, the flow chart proceeds to step 511. Otherwise, the flow chart returns to step 504.

In step 511, based on determining that the buffer is too small, a size of the buffer may be enlarged so that the buffer may be capable of storing a necessary amount of the first media content and/or the second media content. The size may be increased in order to provide additional time for the transmission and/or receipt of content, such that display of the content is not interrupted. For example, a user device may be instructed to temporarily increase the size of its buffer (e.g., from ten seconds to twenty seconds) based on determining that a delay of approximately ten seconds is likely.

Figure 6:
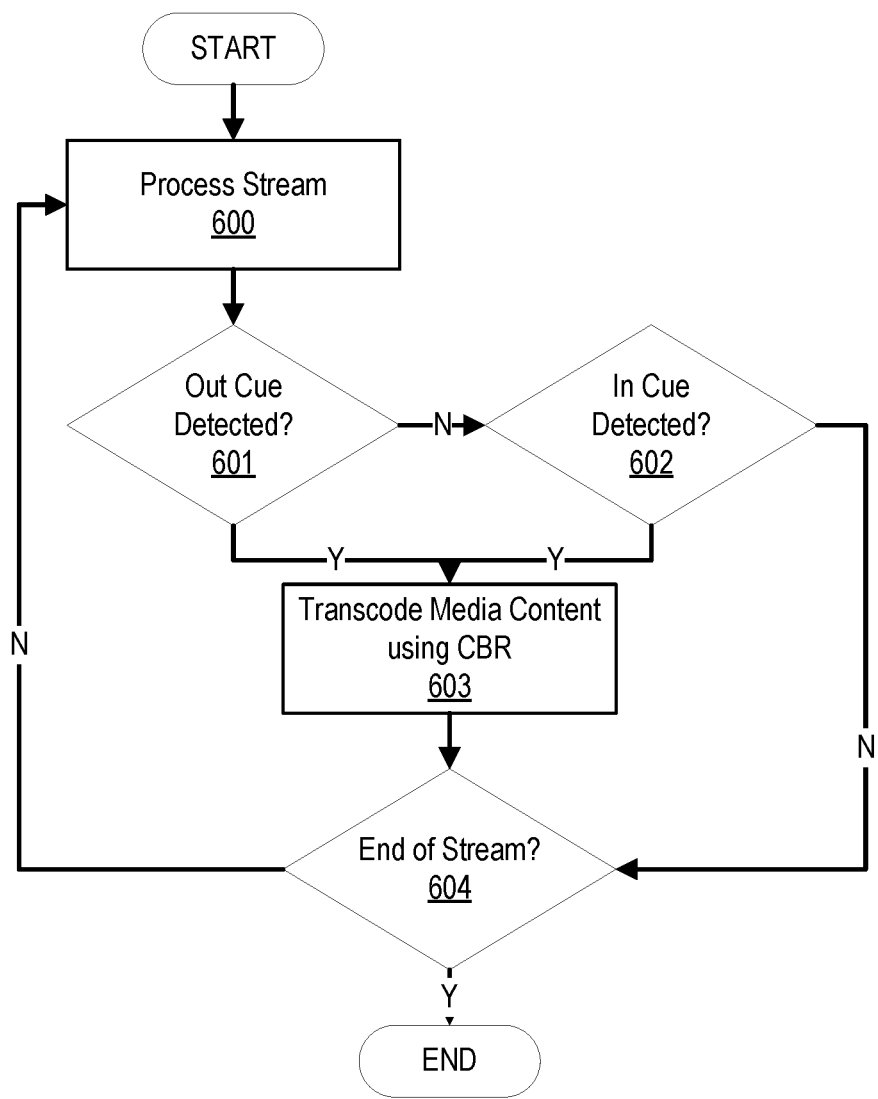
FIG. 6 is a flow chart showing an example method for transcoding a content stream.

FIG. 6 is a flow chart depicting how, in an example implementation of some aspects described herein, a transcoding device may processes described herein may be performed by a transcoding device, such as the transcoder 122, based on cue tones in a content stream. In step 600, the transcoder may process a content stream. Processing may comprise transcoding the content stream using VBR, CBR, or CVBR. For example, processing may comprise encoding media content using default encoding settings, where the default encoding settings are selected to maximize quality. Processing may comprise listening for specific cue tones, such as those described in SCTE 35. For example, a transcoder may analyze an audio waveform in order to detect specified in cue tones and out cue tones. Processing may comprise retrieving a manifest corresponding to the content stream. For example, a transcoder may encode different portions of a content stream based on different encoding settings specified in a manifest corresponding to the content stream.

In step 601, the transcoding device may detect an out cue tone. An out cue tone may indicate the end of first media content and/or the beginning of the second media content. The cue tone may be a cue tone of the type described in SCTE 35. If an out cue tone is detected, the flow chart may continue to step 603. Otherwise, the flow chart may proceed to step 602.

In step 602, the transcoding device may detect an in cue tone. An in cue tone may indicate the end of second media content and/or the beginning of the next media content. As with the out cue tone, the in cue tone may be a cue tone of the type described in SCTE 35. If an in cue tone is detected, the flow chart may proceed to step 603. Otherwise, the flow chart may continue to step 604.

In step 603, based on detecting the out cue tone or the in cue tone, the content stream may be encoded using a constant bit rate for a period of time. The period of time may be selected such that at least a portion of first media content and at least a portion of second media content are encoded using a constant bit rate. For example, the processing performed in step 600 may encode first media content and second media content in VBR; however, for two seconds at the end of the first media content and for four seconds at the beginning of the second media content, both the first media content and the second media content may be encoded using CBR. Additionally and/or alternatively, in step 603, one or more frames may be removed and/or repeated, and/or a buffer associated with the content stream may be modified.

In step 604, it is determined whether the end of the content stream has been reached. If so, the flow chart ends. Otherwise, the flow chart returns to step 600 and continues to process the content stream.

Figure 7:
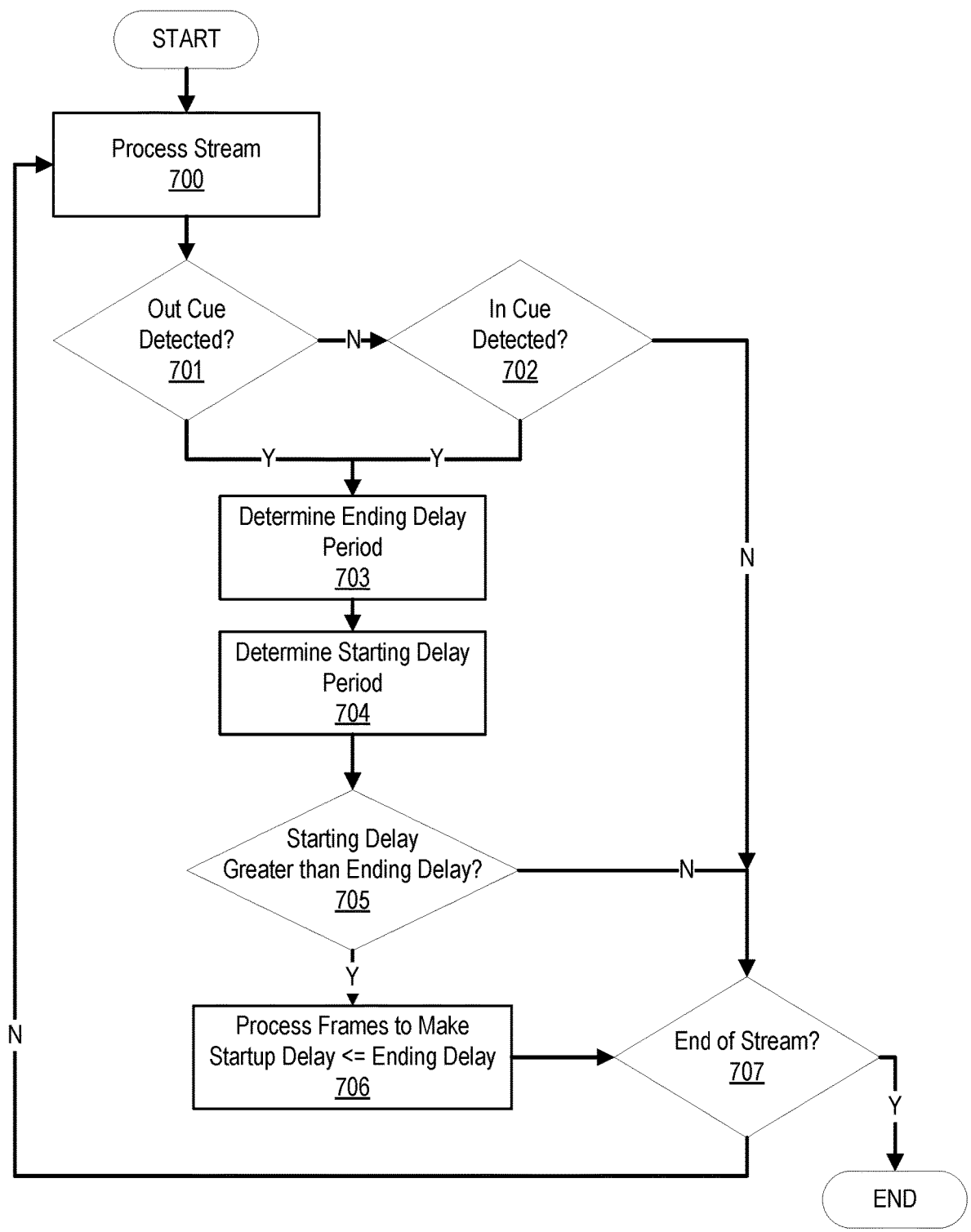
FIG. 7 is a flow chart showing an example method for transcoding a content stream.

FIG. 7 is a flow chart depicting how, in an example implementation of some aspects described herein, the processes described herein may be performed by a transcoding device, such as the transcoder 122, by analyzing a starting delay period and an ending delay period. Step 700, step 701, and step 702 are similar to step 600, step 601, and step 602, respectively. In step 700, a content stream is processed. If an out cue is detected in step 701, the flow chart proceeds to step 703. Otherwise, the flow chart continues to step 702. If an in cue is detected in step 702, the flow chart proceeds to step 703. Otherwise, the flow chart continues to step 707.

In step 703, an ending delay period is determined. In step 704, a starting delay period is determined. Both the ending delay period and the starting delay period may be projected and/or estimated based on network conditions, the processing capability of user devices and/or intermediary devices, the length of one or more portions of the first media content and/or the second media content, or similar considerations. If an out cue is detected, then the ending delay period may be more reliably estimated than the startup delay period, as frames corresponding to the second media content may not have yet been received. If an in cue is detected, then the starting delay period may be more reliably determined than the ending delay period, as the actual ending delay period resulting from one or more previous frames may not be known.

In step 705, it is determined whether the starting delay is greater than the ending delay. If the starting delay is greater than the ending delay, then the first media content may end sooner than the second media content may be retrieved, decoded, and displayed. Such a circumstance may result in nothing being displayed, as represented by box 404 of FIG. 4a. If the starting delay is greater than the ending delay, the flow chart may proceed to step 706. Otherwise, the flow chart continues to step 707.

In step 706, one or more frames of the first media content and/or the second media content may be processed to cause the startup delay to be approximately less than or equal to the ending delay. For example, the one or more frames of the first media content and/or the second media content may be re-encoded such that the startup delay is a predetermined amount of time less than the ending delay. Processing may comprise re-encoding all or portions of the first media content and/or the second media content, removing one or more unnecessary frames from the first media content and/or the second media content, causing one or more frames of the first media content and/or the second media content to repeat, and/or modifying a buffer associated with a device configured to receive the first media content and/or the second media content. For example, the transcoder may select CBR encoding parameters (e.g., a constant bit rate budget) based on a projection that, when all or portions of the first media content and/or the second media content are encoded using the CBR encoding parameters, the startup delay will be approximately less than or equal to the ending delay.

In step 707, it is determined whether the end of the stream has been reached. If so, the flow chart ends. Otherwise, the flow chart returns to step 700.

Figure 8:
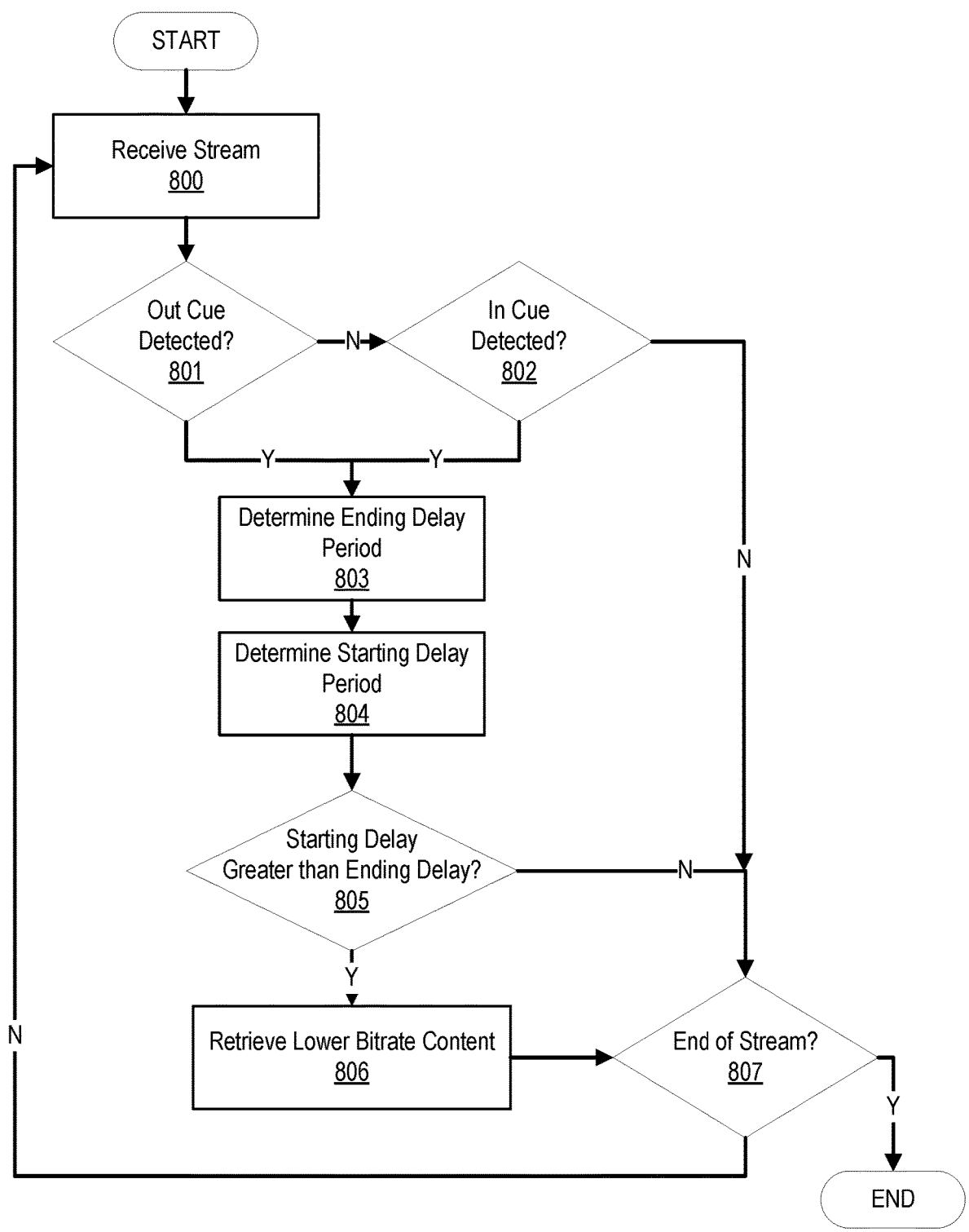
FIG. 8 is a flow chart showing an example method for receiving a content stream.

FIG. 8 is a flow chart depicting how, in an example implementation of some aspects described herein, user equipment (e.g., a set-top box or other forms of the gateway 111) may retrieve lower bitrate content. In step 800, a content stream may be received. For example, a set-top box may receive a content stream corresponding to a television channel. The received stream may be monitored (e.g., by the user device) for one or more cue tones and/or one or more indications of a transition period between first media content and/or second media content. The user device may retrieve a manifest corresponding to the received media content stream and, based on the manifest, determine a transition period between first media content and second media content.

Step 801 and step 802 are similar to step 601 and step 602, respectively. In step 801, if an out cue is detected, the flow chart may proceed to step 803. Otherwise, the flow chart proceeds to step 802. In step 802, if an in cue is detected, the flow chart may proceed to step 803. Otherwise, the flow chart may continue to step 807.

In step 803, if an out cue or an in cue are detected, an ending delay period is determined. In step 804, a starting delay period is determined. Both step 803 and step 804 are similar to step 703 and step 704, respectively. In step 805, it is determined whether the starting delay is greater than the ending delay. If so, the flow chart proceeds to step 806. Otherwise, the flow chart continues to step 807.

In step 806, if the starting delay period is greater than the ending delay period, lower bitrate content may be retrieved. Retrieval of lower bitrate content may comprise retrieving a lower bit rate portion of the first media content and/or the second media content. For example, based on determining that the starting delay period associated with an advertisement is greater than the ending delay period associated with a television show, a lower bit rate version of the ad may be retrieved when switching from a television show to an advertisement. Additionally and/or alternatively, retrieval of lower bitrate content may comprise causing a transcoder to encode all or portions of the content stream at a lower bitrate by, for example, transmitting a request for lower bit rate content to the transcoder. Additionally and/or alternatively, a buffer may be modified to make the starting delay approximately less than or equal to the ending delay. Additionally and/or alternatively, one or more frames may be skipped and/or repeated in order to make the starting delay approximately less than or equal to the ending delay.

In step 807, it is determined whether the end of the content stream has been reached. If so, the flow chart ends. Otherwise, the flow chart returns to step 800.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, based on comparing a first time period, associated with an end of a first portion of first content encoded at a constant bit rate, and a second time period associated with second content encoded at a variable bit rate, a transition from a first portion of frames of the first content to a second portion of frames of the second content;
   encoding, at the constant bit rate, the second portion of frames of the second content; and
   outputting for display the first portion of frames before the second content.

2. The method of claim 1, further comprising:
   removing one or more last frames of the first portion of the first content.

3. The method of claim 1, wherein the outputting for display the first portion of frames before the second content comprises:
   causing repeating of at least one of the first portion of frames.

4. The method of claim 1, wherein the comparing the first time period and the second time period comprises determining that the end of the first portion of the first content will occur before transmission, to a computing device, of the second content is complete.

5. The method of claim 1, further comprising:
   based on the comparing, modifying a size of a video buffer associated with the second content.

6. The method of claim 1, wherein the comparing the first time period and the second time period comprises determining that the end of the first portion of the first content will occur before a computing device is ready to display the second content.

7. The method of claim 1, wherein the encoding comprises:
   selecting, based on the comparing, a quantization parameter for encoding the second portion of frames.

8. One or more non-transitory computer-readable media storing instructions that, when executed, cause:
   determining, based on comparing a first time period, associated with an end of a first portion of first content encoded at a constant bit rate, and a second time period associated with second content encoded at a variable bit rate, a transition from a first portion of frames of the first content to a second portion of frames of the second content;
   encoding, at the constant bit rate, the second portion of frames of the second content; and
   outputting for display the first portion of frames before the second content.

9. The non-transitory computer-readable media of claim 8, wherein the instructions, when executed, cause:
   removing one or more last frames of the first portion of the first content.

10. The non-transitory computer-readable media of claim 8, wherein the instructions, when executed, cause the outputting for display the first portion of frames before the second content by causing:
    causing repeating of at least one of the first portion of frames.

11. The non-transitory computer-readable media of claim 8, wherein the instructions, when executed, cause the comparing the first time period and the second time period by causing determining that the end of the first portion of the first content will occur before transmission, to a computing device, of the second content is complete.

12. The non-transitory computer-readable media of claim 8, wherein the instructions, when executed, further cause:
    based on the comparing, modifying a size of a video buffer associated with the second content.

13. The non-transitory computer-readable media of claim 8, wherein the instructions, when executed, cause the comparing the first time period and the second time period by causing determining that the end of the first portion of the first content will occur before a computing device is ready to display the second content.

14. The non-transitory computer-readable media of claim 8, wherein the instructions, when executed, cause the encoding by causing:
    selecting, based on the comparing, a quantization parameter for encoding the second portion of frames.

15. An apparatus comprising:
    one or more processors; and
    memory storing instructions that, when executed by the one or more processors, cause the apparatus to:

determine, based on comparing a first time period, associated with an end of a first portion of first content encoded at a constant bit rate, and a second time period associated with second content encoded at a variable bit rate, a transition from a first portion of frames of the first content to a second portion of frames of the second content;

encode, at the constant bit rate, the second portion of frames of the second content; and output for display the first portion of frames before the second content.

16. The apparatus of claim 15, wherein the instructions, when executed by the one or more processors, cause the apparatus to:

remove one or more last frames of the first portion of the first content.

17. The apparatus of claim 15, wherein the instructions, when executed by the one or more processors, cause the apparatus to output for display the first portion of frames before the second content by causing the apparatus to:

cause repeating of at least one of the first portion of frames.

18. The apparatus of claim 15, wherein the instructions, when executed by the one or more processors, cause the apparatus to compare the first time period and the second time period by causing the apparatus to determine that the end of the first portion of the first content will occur before transmission, to a computing device, of the second content is complete.

19. The apparatus of claim 15, wherein the instructions, when executed by the one or more processors, further cause the apparatus to:

based on the comparing, modify a size of a video buffer associated with the second content.

20. The apparatus of claim 15, wherein the instructions, when executed by the one or more processors, cause the apparatus to compare the first time period and the second time period by causing the apparatus to determine that the end of the first portion of the first content will occur before a computing device is ready to display the second content.

* * * * *